United States Patent [19]

Harrison et al.

[11] Patent Number: 5,260,343
[45] Date of Patent: Nov. 9, 1993

[54] LOW DENSITY FLEXIBLE INTEGRAL SKIN POLYURETHANE SYSTEMS USING THERMOPLASTIC HYDROCARBON MICROSPHERES AND WATER AS CO-BLOWING AGENTS

[75] Inventors: Richard P. Harrison, Lincoln Park; Valeri L. Valoppi, Southgate, both of Mich.

[73] Assignee: BASF Corporation, Parsippany, N.J.

[21] Appl. No.: 60

[22] Filed: Jan. 4, 1993

[51] Int. Cl.⁵ .............. C08J 9/24; C08J 9/32; C08J 9/34
[52] U.S. Cl. ............... 521/51; 264/45.5; 264/DIG. 6; 521/54; 521/137
[58] Field of Search .............. 521/51, 54, 137; 264/45.5, DIG. 6

[56] References Cited

U.S. PATENT DOCUMENTS 3,615,972 10/1971 Morehouse, Jr. et al. ........... 521/54

Primary Examiner—Morton Foelak
Attorney, Agent, or Firm—William G. Conger

[57] ABSTRACT

It was found that a combination of thermoplastic microspheres containing a volatile hydrocarbon and water could be used as effective co-blowing/density reducing agents in low density, integral skin polyurethane foams.

6 Claims, No Drawings

LOW DENSITY FLEXIBLE INTEGRAL SKIN POLYURETHANE SYSTEMS USING THERMOPLASTIC HYDROCARBON MICROSPHERES AND WATER AS CO-BLOWING AGENTS

BACKGROUND OF THE INVENTION

The present invention relates to an integral skin polyurethane foam composition and a process for preparing said foam. In particular, the invention relates to those foams utilizing a thermoplastic sphere containing a hydrocarbon as a co-blowing agent with water. The use of the hydrocarbon containing spheres and water obviates the need to use the ozone depleting chlorofluorocarbons in low density integral skin systems.

DESCRIPTION OF THE RELATED ART

Integral skin foams are well known to those skilled in the art of polyurethane foams. Such foams have a cellular interior and a higher density microcellular or noncellular skin. In general, to prepare such foams one reacts an organic isocyanate with a substance having at least one isocyanate reactive group in the presence of a catalyst, blowing agent, and a variety of optional additives. The reaction is carried out in a mold where a higher density skin forms at the interface of the reaction mixture and the relatively cool inner surface of the foam.

At the present time, the most common type of blowing agent used in integral skin polyurethane foams is chlorofluorocarbons (CFCs) or combinations of CFCs and other blowing agents. Industry today, however, is faced with a mandate to reduce and eventually eliminate the use of CFCs. To this end, much energy is being devoted.

Past methods of preparing integral skin polyurethanes with CFCs as a blowing agent includes G.B. Patent No. 1,209,297, which teaches the use of a combination blowing agent consisting of a CFC and hydrate of an organic compound which splits off water at temperatures above 40° C. This blowing agent or combination of agents was used in a formulation with a suitable polyisocyanate, a polyol-containing hydroxyl group, and a catalyst. This patent discloses the undesirability of having free water in the system. The patent states that the presence of even small quantities of water produce a skin that is permeated with fine cells.

U.S. Pat. No. 4,305,991 describes a process for preparing integral skin polyurethane foams wherein a polyisocyanate containing aliphatically and/or cycloaliphatically bound isocyanate groups is reacted with polyhydroxyl compounds containing ether linkages, a chain extender, a catalyst, additives, and a blowing agent. The blowing agent is characterized as a readily volatile organic substances, examples of which include both halogenated and nonhalogenated volatile organic compounds to which water may be added as a chemical blowing agent.

More recently, attempts have been made to evaluate the performance of alternate blowing agents to CFCs. In a paper by J.L.R. Clatty and S.J. Harasin entitled, *Performance of Alternate Blowing Agents to Chlorofluorocarbons in RIM Structural and Elastomeric Polyurethane Foams*, presented to the 32nd Annual Polyurethane Technical/Marketing Conference, October 1989, the authors addressed the use of water as a blowing agent for integral skin polyurethane reaction injection molded systems (RIM). In this application, the water concentration in the system is controlled by the concentration and type of molecular sieves used. As in the Great Britain patent discussed previously, the water is not in a free form but bound in some manner. In this instance, the authors state that this process is limited to use in rigid foam systems; and the flexible integral skin formulations may best be served by using HCFCs or HCFC-22 as substitutes for CFCs.

It has been found that the CFCs can be replaced as a blowing agent with a combination of thermoplastic spheres containing a volatile hydrocarbon and water. These foams are useful in polyurethane shoe sole applications and in automotive steering wheels.

SUMMARY OF THE INVENTION

It is the object of the present invention to provide a flexible, low density, integral skin polyurethane foam; wherein, the integral skin foam uses no CFCs or HCFCs as blowing agents. This flexible integral skin foam, comprises:

A) a polyisocyanate component,
B) isocyanate reactive polyols having a functionality of at least 1.5,
C) thermoplastic microspheres containing a volatile hydrocarbon,
D) water as a co-blowing agent,
E) a catalyst capable of promoting urethane formation,
F) a chain extender,
G) optionally a surfactant,
H) optionally an essentially linear alcohol having from 10 to 20 carbons, and
I) optionally fillers, pigments, antioxidants, and stabilizers.

The general process comprises reacting a polyisocyanate component with an isocyanate reactive compound. This is done in the presence of a catalyst of a type known by those skilled in the art in sufficient quantity to catalyze the reaction, thermoplastic spheres containing a volatile hydrocarbon as a co-blowing agent with water; a surfactant; a chain extender; optionally a $C_{10-20}$ alcohol, fillers, pigments, antioxidants, and stabilizers.

The organic polyisocyanates used in the instant process contain aromatically bound isocyanate groups. Representative of the types of organic polyisocyanates contemplated herein include, for example, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene,m-phenylene diisocyanate, 2,4-toluene diisocyanate, 2,6-toluene diisocyanate, mixtures of 2,4- and 2,6-toluene diisocyanate, hexahydrotoluene diisocyanate, 1,5-naphthalene diisocyanate, 1-methoxy-2,4-phenylene diisocyanate,4,4'-biphenylmethane diisocyanate,4,4'-biphenylene diisocyanate,3,3'-dimethyl-4,4'-diphenylmethane diisocyanate, 3,3'-4,4'-diphenylmethane diisocyanate, and 3,3'-dimethyldiphenylmethane-4,4'-diisocyanate; the triisocyanates such as 4,4',4''-triphenylmethane triisocyanate, polymethylene polyphenylene polyisocyanate, and 2,4,6-toluene triisocyanate; and the tetraisocyanates such as 4,4-dimethyl-2,2'-5,5'-diphenylmethane tetraisocyanate. Especially useful due to their availability and properties are 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the usable isocyanates are the modifications of the above isocyanates which contain carbodiimide, allophanate, alkylene, or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound determined by the well-known Zerewitinoff Test, as described by Kohler in *Journal of the American Chemical Society*, 49, 3181 (1927). These compounds and their methods of preparation are well known in the art. The use of any one specific active hydrogen compound is not critical hereto; rather, any such compound can be employed herein. Generally, the quasi-prepolymers have a free isocyanate content of from 20 percent to 40 percent by weight.

Mixtures of diphenylmethane diisocyanate and carbodiimide or urethane-modified MDI are preferred.

Any suitable polyoxyalkylene polyether polyol may be used such as those resulting from the polymerization of a polyhydric alcohol and an alkylene oxide. Representatives of such alcohols may include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process, such as the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Other polyoxyalkylene polyether polyols which may be employed are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056; the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C. trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyloxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetam, inoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. Nos. 3,652,659 and Re. 29,014 may be employed in preparing the graft polymer dispersions used in the instant invention, the disclosures of which are incorporated by reference.

Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927; and 3,346,557, the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate, or epoxy group; or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis ($\beta$-chloroethyl)vinyl phosphonate, vinyl ethyl sulfide, vinyl ethyl sulfone, N-methyl-N-vinyl acetamide, N-vinyl pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used, and the compounds listed above are illustrative and not restrictive of the monomers suitable for use in this invention. Preferably, the monomer is selected from the group consisting of acrylonitrile, styrene, methyl methacrylate, and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumeme hydroperoxide, paramenthane hydroperoxide, di-$\alpha$-cumyl-peroxide, dipropyl peroxide, diisopropyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, cyclohexyl hydroperoxide, trans-decalin hydroperoxide, $\alpha$-methylbenzyl hydroperoxide, $\alpha$-methyl-$\alpha$-ethyl benzyl hydroperoxide, tetralin hydroperoxide, triphenylmethyl hydroperoxide, diphenylmethyl hydroperoxide, $\alpha,\alpha'$-azobis(2-methyl)heptonitrile, 1,1-azo-bis(1-cyclohexane)carbonitrile, dimethyl $\alpha,\alpha'$-azobis(isobutyronitrile), 4,4'-azobis(cyanopetanoic) acid, azobis(isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-butylazo-2-cyanobutane, 1-cyano-1-(t-butylazo)cyclohexane, t-butyl peroxy-2-ethylhexanoate, t-butyl perpivalate, 2,5-dimethylhexane-2,5-diper-2-ethylhexoate, t-butylperneo-decanoate, t-butyl perbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840, which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

The preferred polyols are polyethers having an average functionality of about 1.75 to about 3.0 and a molecular weight range of from about 3500 to about 5100. The most preferred polyols are polyethers which are copolymers of ethylene oxide and propylene oxide having a diol or triol initiator such as propylene glycol glycerine or trimethylolpropane. Included with this group are the previously described graft polymer dispersions.

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltin diacetate, stannous chloride, dibutyltin di-2-ethyl hexanoate, stannous oxide, available under the FOMREZ ® trademark, as well as other organometallic compounds such as are disclosed in U.S. Pat. No. 2,846,408.

An alcohol having from about 10 to about 20 carbons or mixtures thereof may be used in the present invention. Alcohols of this type are known to those skilled in the art. The types of alcohols contemplated are commonly produced via the oxo process and are referred to as oxo-alcohols. Examples of some commercially available products include LIAL 125 from Chemica Augusta Spa or NEODOL ® 25 produced by Shell.

A surface active agent is generally used for production of integral skin polyurethane foams of the present invention. Surfactants which may be used are those which aid in homogenizing or emulsifying the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, fluoroaliphatic polymeric esters, paraffin oils, castor oil ester, phthalic acid esters, ricindolic acid ester, and Turkey red oil, as well as cell regulators such as paraffins.

Chain extending agents employed in the present invention include those having two functional groups bearing active hydrogen atoms. A preferred group of chain extending agents includes ethylene glycol, diethylene glycol, propylene glycol, or 1,4-butanediol.

Additives which may be used in the process of the present invention include known pigments, such as carbon black, dyes, and flame retarding agents (e.g., tris-chloroethyl phosphates or ammonium phosphate and polyphosphate), stabilizers against aging and weathering, plasticizers, such as gamma butylactone, fungistatic and bacteriostatic substances, and fillers.

The blowing and density controlling agents used according to the present invention are thermoplastic spheres containing a volatile hydrocarbon and water. In the instant invention, the spheres comprise a drop of liquid hydrocarbon encapsulated by a gas impermeable polymeric shell. When exposed to heat, the spheres can expand to more than 60 times their initial volume. When in the unexpanded state, the spheres resemble a dry, white powder having a particle size from 5 to 30 μm. The spheres used in the present invention consist of an acrylonitrile-vinylidene chloride outer shell enclosing a drop of isobutane. Thermoplastic spheres such as those used in the present invention are available from Nobel Industries. For purposes of the present invention, the expandable microspheres are used in amounts of from 1.5 percent by weight to about 15 percent by weight of the total of the non-isocyanate components, with from 2.5 percent to 5.0 percent preferred. Water is used as an economical, easy to use, co-blowing agent. The amount used varies with the desired overall final foam density.

The mechanical parameters of the instant process are flexible and depend on the final application of the integral skin polyurethane foam. The reaction system is versatile enough that it may be made in a variety of densities and hardnesses. The system may be introduced into a mold in a variety of ways known to those skilled in the art. It may be shot into a preheated closed mold via high pressure injection technique. It may also be run using a conventional open mold technique wherein the reaction mixture or system is poured or injected at low pressure or atmospheric pressure into a preheated open mold.

Having thus described the invention, the following examples are given by way of illustration. All amounts are given in parts by weight unless otherwise indicated.

Polyol A is a glycerine initiated polyoxypropylene polyoxyethylene block copolymer having a hydroxyl number of about 35 and a molecular weight of about 4146.

Polyol B is a dipropylene glycol initiated polyoxypropylene-polyoxyethylene block copolymer having a hydroxyl number of 29 and a molecular weight of 3473.

Polyol C is 77 percent of a 30 percent (1:1, acrylonitrile:styrene) graft polymer dispersed in a trimethylolpropane initiated polyoxypropylene-polyoxyethylene block copolymer blended with 23 percent by weight of the above-described trimethylolpropane initiated block copolymer.

XFE-1028 is an amine catalyst comprising a proprietary blend available from Air Products.

BL-11 is 70 percent bis(dimethylaminoethyl)ether and 30 percent dipropylene glycol catalyst available from Air Products.

BL-17 is a delayed action, acid-blocked version of BL-11 also from Air Products.

UL-6 is an organometallic catalyst available from Fomrez.

UL-32 is an organometallic catalyst available from Fomrez.

Lial 125 is an essentially linear alcohol having from 10 to 20 carbons. It is available from Chemica Augusta Spa.

PPK 839 is carbon black dispersed in a propylene glycol initiated polyoxypropylene homopolymer having a hydroxyl number of 260 and a molecular weight of 431.

DU-551 is a dry unexpanded thermoplastic microsphere having a gas impervious outer shell consisting of acrylonitrile and vinylidene chloride surrounding a drop of isobutane. It is available from Nobel Industries.

Iso A is an isocyanate prepolymer comprising the reaction product of 54 percent of an essentially pure 4,4'-diphenylmethane diisocyanate, 22 percent of a carbodiimide modified 4,4'-diphenylmethane diisocyanate, and 24 percent of a propylene glycol initiated polyoxypropylene homopolymer.

Iso B is a mixture comprising 50 percent essentially pure 4,4'-diphenylmethane diisocyanate and 50 percent of a urethane modified 4,4'-diphenylmethane diisocyanate.

Iso C is a 1:1 mixture of Iso B and a carbodiimide modified 4,4'-diphenylmethane diisocyanate.

TABLE 1

| COMPONENT | 1 | 2 | 3 | 4 |
|---|---|---|---|---|
| POLYOL A | 76.01 | 71.87 | 67.73 | 63.60 |
| POLYOL C | 15.86 | 15 | 14.14 | 13.27 |
| ETHYLENE GLYCOL | 6.0 | 6.0 | 6.0 | 6.0 |
| XFE-1028 | 0.5 | 0.5 | 0.5 | 0.5 |
| BL-17 | 0.1 | 0.1 | 0.1 | 0.1 |
| UL-6 | 0.03 | 0.03 | 0.03 | 0.03 |
| LIAL 125 | 1.0 | 1.0 | 1.0 | 1.0 |
| WATER | 0.5 | 0.5 | 0.5 | 0.5 |
| DU-551 | 0 | 5 | 10 | 15 |
| ISO A | 55.03 | 54.51 | 54.00 | 53.48 |
| 100 INDEX | | | | |
| PHYSICAL PROPERTIES* | | | | |
| SECTIONAL DENSITY (pcf) | 27.90 | 25.98 | 25.72 | 25.26 |
| TENSILE (psi) | 208.3 | 249.0 | 262.7 | 260.7 |
| ELONGATION PERCENT | 126.7 | 113.3 | 83.3 | 76.7 |
| SPLIT TEAR (pi) | 17.4 | 21.5 | 19.6 | 19.0 |
| GRAVES TEAR (pi) | 52.2 | 50.2 | 45.8 | 56.8 |
| SHORE A HARDNESS-INSTANT | 46 | 50 | 56 | 68 |
| SHORE A HARDNESS-AFTER 5 SECONDS | 45 | 49 | 54 | 65 |
| TABER ABRASION, mg LOSS, 18 WHEEL | 121.7 | 202.0 | 189.8 | 324.8 |
| ROSS FLEX K CYCLES TO FAIL @ 20C % CRACK AT 100K | 6.5 | 6.5 | <4.8 | <4.8 |

*PHYSICAL PROPERTIES MEASURED ON FULL CROSS SECTIONAL PIECE OF FOAM

Samples 1–4 of Table 1 were prepared by using a handmix open pour method. Predetermined amounts of the room temperature isocyanate and non-isocyanate components were weighed into a container. The mixture was stirred for seven to ten (7–10) seconds at about 3000 rpm and poured into a clean, dry 12"×6"×⅜" plaque mold. The mold was shut, and the contents were allowed to cure. The finished plaque was removed from the mold and subjected to tests to determine physical properties. Examples 1–4 illustrate the use of the microspheres as a density controlling agent in an integral skin polyurethane foam formulation.

TABLE 2

| COMPONENT | 1 | 2 | 3 |
|---|---|---|---|
| POLYOL A | 68.56 | 68.56 | 68.56 |
| POLYOL B | 15 | 15 | 15 |
| ETHYLENE GLYCOL | 6 | 6 | 6 |
| XFE-1028 | 0.6 | 0.6 | 0.6 |
| BL-11 | 0.3 | 0.3 | 0.3 |

TABLE 2-continued

| COMPONENT | 1 | 2 | 3 |
|---|---|---|---|
| UL-32 | 0.04 | 0.04 | 0.04 |
| LIAL 125 | 1 | 1 | 1 |
| WATER | 0.5 | 0.5 | 0.5 |
| PPK-839 | 3 | 3 | 3 |
| DU-551 | 5.00 | 5.00 | 5.00 |
| ISO A | 53.82 | — | — |
| ISO B | — | 56.86 | — |
| ISO C | — | — | 49.73 |
| 100 INDEX | | | |
| PHYSICAL PROPERTIES | | | |
| SECTIONAL DENSITY | 23.03 | 20.64 | 20.89 |
| TENSILE STRENGTH, psi, SKIN ONLY | 513.5 | 554.6 | 485.433 |
| TENSILE STRENGTH, psi, SKIN & CORE | 391.2 | 365.633 | 300.966 |
| TENSILE STRENGTH, psi, CORE ONLY | 286.233 | 280(201)*** | 167(135)*** |
| ELONGATION, %, SKIN ONLY | 183.333 | 213.333 | 163.333 |
| ELONGATION, %, SKIN & CORE | 150 | 120 | 80 |
| ELONGATION, %, CORE ONLY | 106.666 | 120 (63.5)*** | 75(56.7)*** |
| SPLIT TEAR, pi, SKIN ONLY | 35.61 | 31.295 | 26.35 |
| SPLIT TEAR, pi, SKIN & CORE | 25.95 | 30.515 | 22.135 |
| SPLIT TEAR, pi, CORE ONLY | 16.37 | 13.08 | 14.865 |
| GRAVES TEAR, pi, SKIN ONLY | 139.08 | 133.31 | 134.43 |
| GRAVES TEAR, pi, SKIN & CORE | 85.78 | 94.12 | 76.195 |
| GRAVES TEAR, pi, CORE ONLY | 45.02 | 63.475 | 32.32 |
| SHORE A HARDNESS INSTANT/AFTER 5 SECONDS | 57/55 | 59/55 | 55/50 |
| COMPRESSION SET 22 HRS. @ 158 F., 50% DEFLECTION | 81.655 | 84.215 | 82.78 |
| TABER ABRASION, mg Loss. 18 wheel | 210.8 | 365.5 | 313.7 |

***ALL REPORTED DATA IS AN AVERAGE OF MULTIPLE POINTS. THE NUMBER IN PARENTHESES REPRESNETS AN ABERRANT TEST POINT.

Samples 1-3 in Table 2 were prepared as a machine mix. The individual components were placed in the holding tanks of a high pressure Cannon dispensing machine equipped with an L-head. The isocyanate and non-isocyanate components were preheated to 80° F. A predetermined amount was shot through the mix head into a clean, dry 5"×5"×2" mold. The foam was removed and allowed to cure. Tests were run to determine the physical properties of the integral skin foam. Samples 1-3 illustrate the effectiveness of the co-blowing/density controlling agents in systems using various isocyanates.

We claim:

1. An integral skin polyurethane foam, obtained by reacting an organic polyisocyanate with an isocyanate reactive compound, said isocyanate reactive compound comprising;
   A. a polyol having a functionality of at least 1.5,
   B. expandable thermoplastic microspheres containing a volatile hydrocarbon as a co-blowing agent,
   C. water as a co-blowing agent,
   D. a catalyst capable of promoting urethane formation,
   E. a chain extender,
   F. optionally, an essentially linear alcohol having from 10 to 20 carbons, and
   G. optionally, a surfactant, fillers, pigments, antioxidants, and/or stabilizers.

2. A polyurethane foam as claimed in claim 1, wherein the polyisocyanate is selected from the group consisting essentially pure 4,4'-diphenylmethane diisocyanate, carbodiimide modified 4,4'-diphenylmethane diisocyanate, urethane modified 4,4'-diphenylmethane diisocyanate, and mixtures thereof.

3. A polyurethane foam as claimed in claim 1, wherein the microsphere constitutes from about 1.5 to about 15 percent by weight of the total weight of the non-isocyanate components.

4. A polyurethane foam as claimed in claim 1, wherein the microsphere contains isobutane.

5. A polyurethane foam as claimed in claim 1, wherein the isocyanate reactive polyol is selected from the group consisting of polyether polyols, graft polymer dispersion, and mixtures thereof.

6. A polyurethane foam as claimed in claim 1, wherein the water constitutes 0.5 percent by weight of the total weight of the non-isocyanate components.

* * * * *